United States Patent [19]

Frommelt et al.

[11] 3,934,380

[45] Jan. 27, 1976

[54] LOADING DOCK SHELTERS

[75] Inventors: Cyril P. Frommelt; Sylvan J. Frommelt, both of Dubuque, Iowa

[73] Assignee: Dubuque Awning & Tent Company, Dubuque, Iowa

[22] Filed: Mar. 29, 1974

[21] Appl. No.: 456,011

[52] U.S. Cl................................ 52/173 DS; 52/204
[51] Int. Cl.²..... E06B 1/00; E06B 7/16; E06B 5/00
[58] Field of Search ........ 248/68 R, 73, 291; 14/71, 14/72; 135/5 A; 52/2, 173 DS, 173, 345, 365

[56] References Cited
UNITED STATES PATENTS

| 2,681,698 | 6/1954 | Herman | 14/71 X |
| 3,375,625 | 4/1968 | Edkins | 52/173 |
| 3,391,502 | 7/1968 | O'Neal | 52/2 |
| 3,484,883 | 12/1969 | Van Marle | 52/173 |
| 3,638,667 | 2/1972 | Frommelt | 135/5 A |
| 3,639,934 | 2/1972 | Eggert | 14/71 |
| 3,664,075 | 5/1972 | Hazlewood | 52/173 DS |
| 3,714,745 | 2/1973 | O'Neal | 52/2 |

*Primary Examiner*—Frank L. Abbott
*Assistant Examiner*—William Randolph
*Attorney, Agent, or Firm*—Johnson, Dienner, Emrich & Wagner

[57] ABSTRACT

A loading dock shelter of the pad type, wherein the pads may be moved between operative, projecting position and retracted position.

12 Claims, 8 Drawing Figures

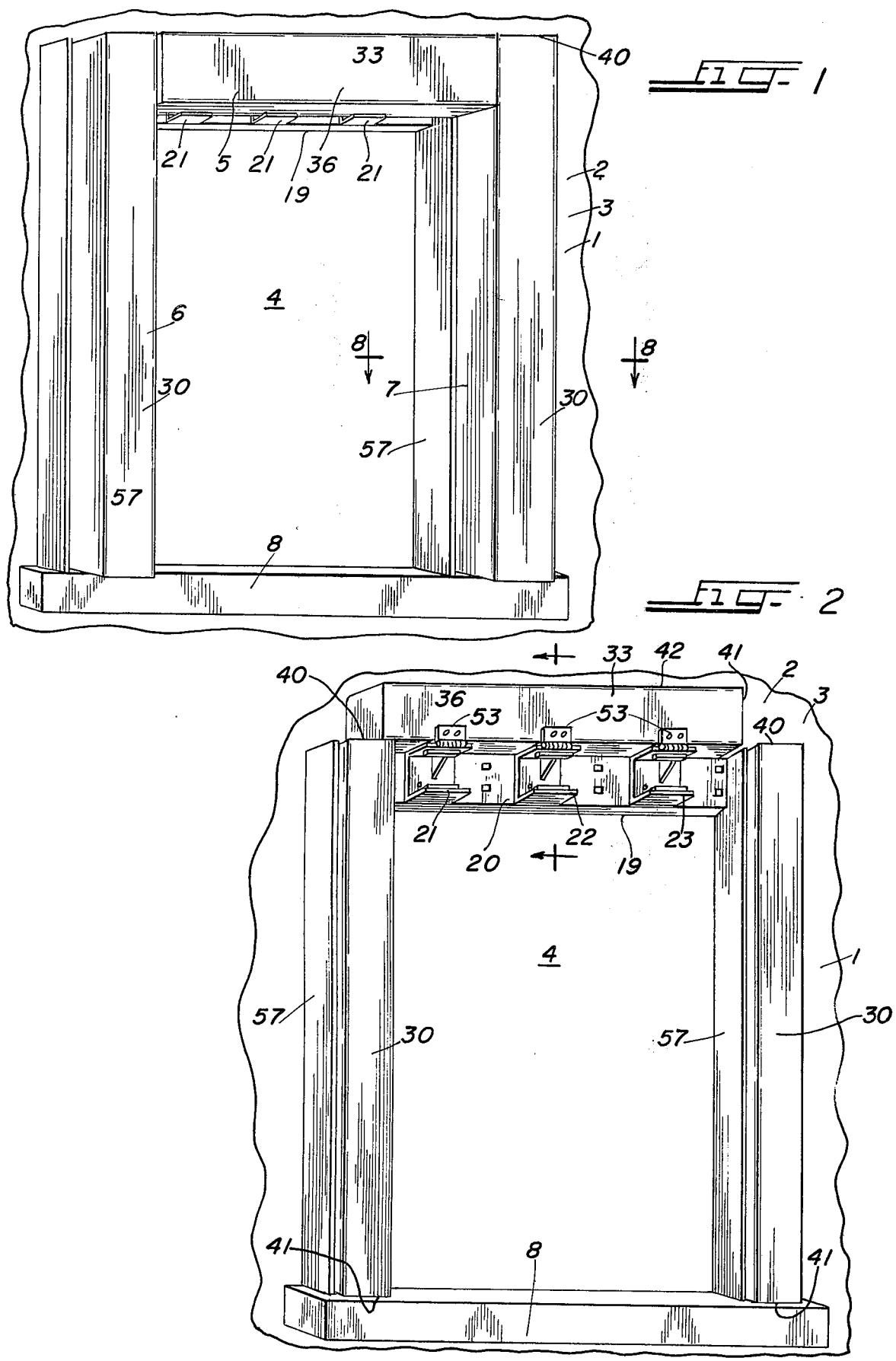

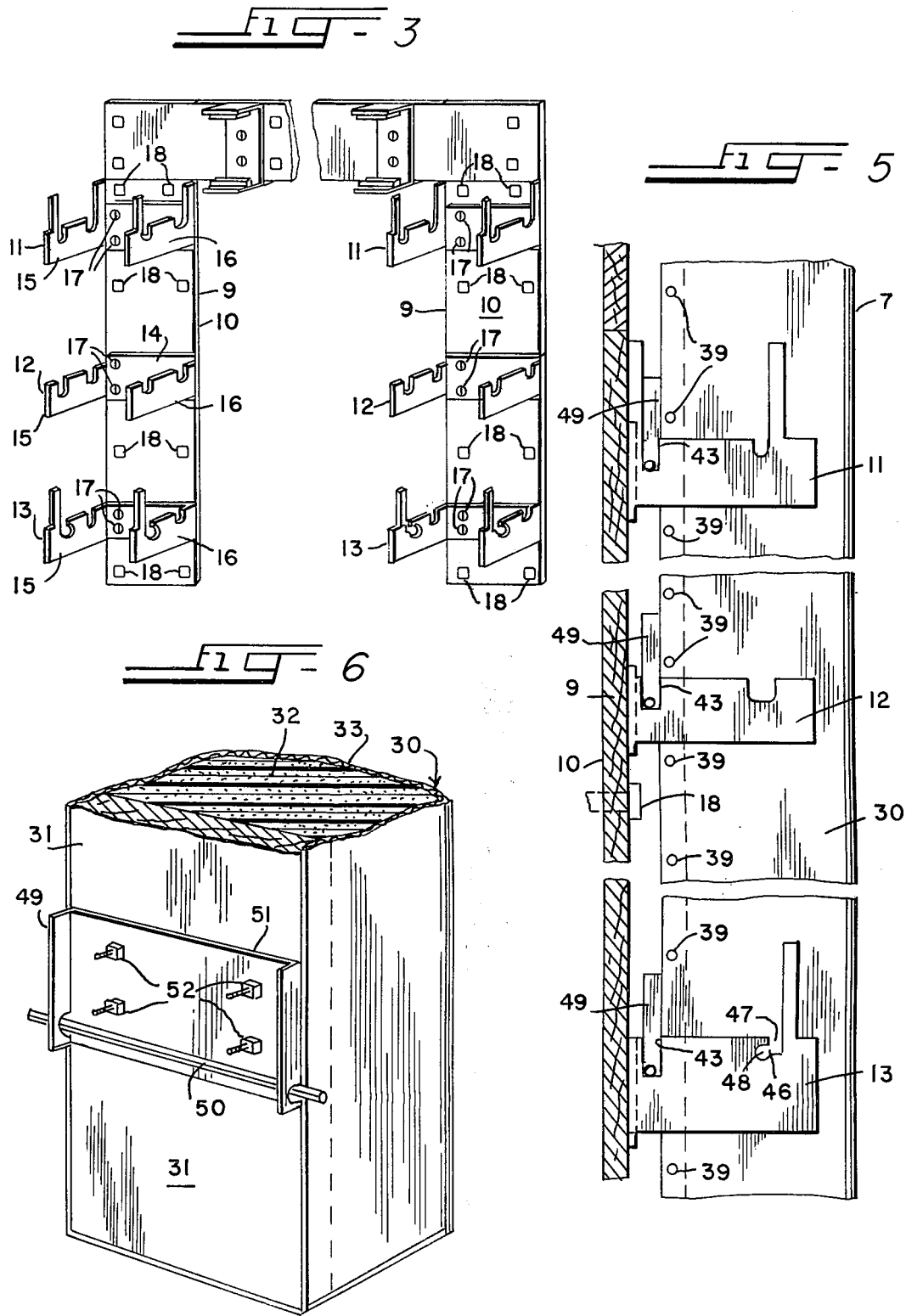

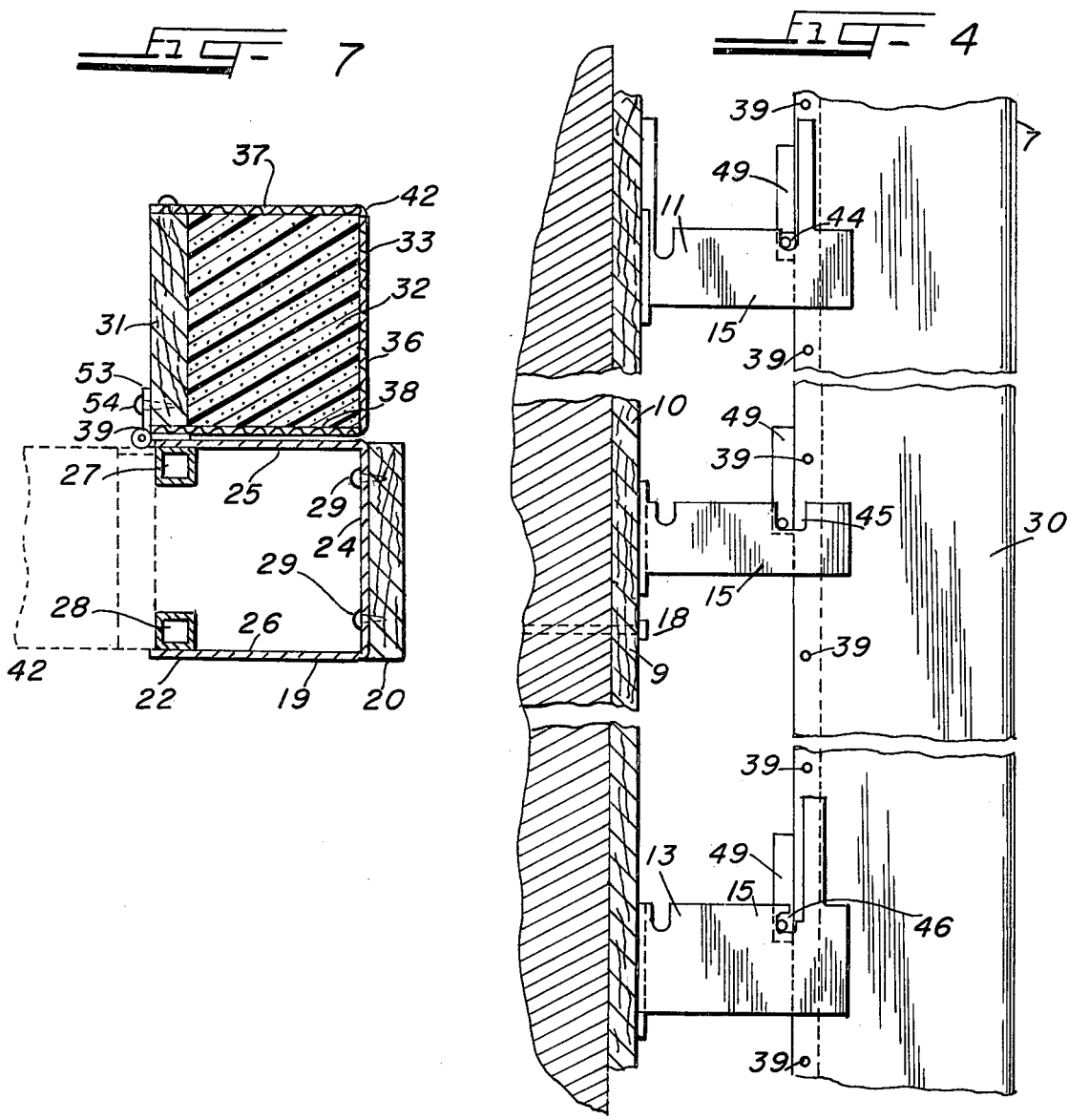
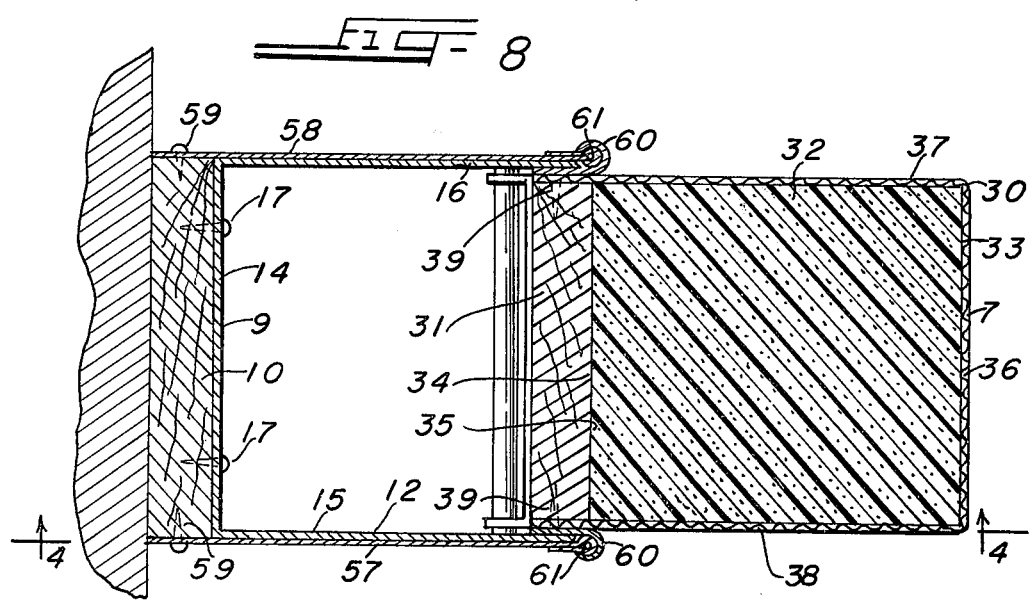

LOADING DOCK SHELTERS

BACKGROUND OF THE INVENTION

This invention relates to loading dock shelters, and, more particularly, to loading dock shelters of the pad type.

It is a primary object of the present invention to afford a novel loading dock shelter.

Another object of the present invention is to afford a novel loading dock shelter of the pad type, as distinguished from loading dock shelters of the "drape-type", such as, for example, those shown in our U.S. Letters Pat. Nos. 3,638,667 and 3,699,733.

Loading dock shelters of the pad type have been heretofore known in the art, being shown, for example, in our U.S. Pat. No. 3,230,675. Such loading dock shelters have been highly successful and afford effective shelter for men and materials during the loading and unloading of a truck, or the like, through a warehouse door equipped with such a shelter. It is an important object of the present invention to afford improvements over pad-type loading dock shelters heretofore known in the art, such as, for example, the shelters of the type disclosed in the aforementioned U.S. Pat. No. 3,230,675.

Loading dock shelters of the pad type commonly are mounted along the sides and across the top of doorways in warehouses, and the like, in position to be sealingly engaged with the rear end of a truck, which is disposed in operative position, relative to the doorway for the loading or unloading of the truck therethrough. Such sealing engagement of the pad units with the rear end of the trucks is effective to protect against the loss of air conditioning between the truck and warehouse on warm days, when the warehouse is air conditioned, and to prevent the entry of cold air into the warehouse between the truck and the doorway on cold days, when the warehouse is being treated. However, on certain occasions, such as, for example, on mild days, when the ventilation relied upon for such a warehouse is the passage of air through such a doorway, such sealing engagement between a pad unit and a rear end of a truck is undesirable. In addition, when such sealing engagement is unnecessary, such as, for example, under the aforementioned conditions on mild days, and the like, the aforementioned sealing engagement of such a truck with the pad unit causes unnecessary wear on the pad unit.

It is an important object of the present invention to afford a novel loading dock shelter of the pad type wherein the pads thereof are movable into and out of a position wherein they are effective to so sealingly engage such a truck.

Another object of the present invention is to afford a novel loading dock shelter of the pad type wherein the pads thereof may be quickly and easily moved into a retracted, or stored position when it is desired that they not sealingly engage a truck disposed in normal loading and unloading position relative to a doorway around which the pad unit is disposed.

A further object of the present invention is to afford a novel loading dock shelter of the aforementioned adjustable pad type, wherein the side pads thereof are constituted and arranged in a novel and expeditious manner effective to hold them against vertical movement when they are operatively engaged by a truck.

Another object of the present invention is to afford a novel loading dock shelter of the aforementioned pad type which is practical and efficient in operation and which may be readily and economically produced commercially.

Other and further objects of the present invention will be apparent from the following description and claims and are illustrated in the accompanying drawings which, by way of illustration, show a preferred embodiment of the present invention and the principles thereof and what we now consider to be the best mode in which we have contemplated applying these principles. Other embodiments of the invention embodying the same or equivalent principles may be used and structural changes may be made as desired by those skilled in the art without departing from the present invention and the purview of the appended claims.

DESCRIPTION OF THE DRAWINGS

In the drawings:

FIG. 1 is a front perspective view of a loading dock shelter of the pad type embodying the principles of the present invention, and showing the shelter disposed in operative position around a warehouse doorway;

FIG. 2 is a view similar to FIG. 1, but showing the parts of the loading dock shelter disposed in a different operative position;

FIG. 3 is a fragmentary front perspective view of a portion of the loading dock shelter shown in FIG. 1;

FIG. 4 is a fragmentary, detail sectional view taken substantially along the line 4—4 in FIG. 8;

FIG. 5 is a view similar to FIG. 4, but showing the parts of the loading dock shelter disposed in different operative position;

FIG. 6 is a fragmentary, rear perspective view of a portion of the loading dock shelter shown in FIGS. 4 and 5;

FIG. 7 is a detail sectional view taken substantially along the line 7—7 in FIG. 2; and FIG. 8 is a detail sectional view taken substantially along the line 8—8 in FIG. 1.

DESCRIPTION OF THE EMBODIMENT SHOWN HEREIN

A loading dock shelter 1 embodying the principles of the present invention, is shown in the drawings to illustrate the presently preferred embodiment of the present invention. It is shown mounted on an outer wall 2 of a warehouse 3 in surrounding relation to a doorway 4 in the warehouse wall 2, FIGS. 1 and 2.

The loading dock shelter 1 embodies, in general, a head pad 5 and two oppositely disposed side pads 6 and 7. In operation, the shelter 1 is mounted on the warehouse wall 2 in such position that the head pad 5 is disposed above and extends along the top of the doorway 4, and the side pads 6 and 7 are disposed laterally outwardly of, and extend along respective vertical sides of the doorway 4. An elongated bumper 8 is mounted on the warehouse wall 2 below the doorway 4 and the lower ends of the side pads 6 and 7, the bumper 8 projecting outwardly from the warehouse wall 2 and extending along the lower edge of the doorway 4, FIGS. 1 and 2.

As will be discussed in greater detail presently, the pads 5–7 are adjustable between one position, as shown in FIG. 1, wherein they project outwardly beyond the bumper 8 into position to be operatively engaged by the rear end of a truck, now shown, which is to be loaded or unloaded through the doorway 4; and another position wherein they project outwardly from the wall to a lesser distance than the bumper 8, as shown in FIG. 2, so that they are protected against such engagement with such a truck by the bumper 8.

The side pads 6 and 7 are identical in construction. Each includes a supporting member 9, FIGS. 3–5, embodying an elongated backing plate or backing member 10, having a plurality of mounting brackets 11, 12 and 13 projecting outwardly from one face thereof. The backing members 10 may be made of any suitable material such as, for example, wood or steel, or the like, but preferably are made from a suitable wooden member, such as, for example, wood planking. The mounting brackets 11–13 may be made of any suitable material, such as, for example, mild steel, and each is substantially U-shaped in horizontal, transverse cross section. EAch of the mounting brackets 11–13 embodies an elongated base member 14, from the outer ends of which project two side members 15 and 16, the latter being disposed in substantially parallel relation to each other. Mounting brackets 11–13 on each of the bases 9 are secured to one face of the respective backing members 10 by suitable means such as screws or bolts 17, FIGS. 3 and 8. In the assembled loading dock shelter 1, the bases 9 are secured to the warehouse wall 2, on respective sides of the doorway 4, by suitable means such as screws or bolts 18, FIGS. 3 and 4, the brackets 11-13 projecting directly outwardly away from the wall 2.

The head pad 5, like the side pads 6 and 7, includes a supporting member 19 embodying an elongated backing plate or backing member 20 having a plurality of mounting brackets 21, 22 and 23 mounted on one face thereof in spaced relation to each other, FIG. 2. The backing member 20, like the backing member 10, may be made of any suitable material such as, for example, wood or steel, but, preferably, is made from a single wooden member, such as, for example, wood planking.

The bracket members 21–23 are identical in construction, and each is substantially U-shaped in vertical, transverse cross section, FIGS. 2 and 7. Each embodies an elongated, vertically extending base member 24, from the upper and lower ends of which two side members 25 and 26 project in substantially parallel relation to each other. Two abutment members 27 and 28, in the form of suitable lengths of square tubing, are mounted on the inner faces of the side members 25 and 26, respectively, adjacent to the edges of the side members 25 and 26 remote from the base 24, FIGS. 2 and 7. The brackets 21–23 and the tubular members 27 and 28 may be made of any suitable material, such as, for example, mild steel, and are secured together by suitable means, such as welding. The brackets 21–23 are mounted on the backing member 20 by a suitable means such as screws or bolts 29 extending through the bases 24.

In addition to the supporting members 9, each of the side pads 6 and 7 embodies a pad unit 30. The pad units 30 are identical in construction, and each includes an elongated backing member or backing plate 31. The backing members 31 may be made of any suitable material, such as, for example, wood or steel, or the like, but, preferably, are made from a suitable wooden material, such as, for example, the aforementioned wood planking.

Each of the pad units 30 also includes a core 32 and a cover member 33, FIGS. 6 and 8, which extend the full length of the backing member 31. The core 32 may be made of any suitable material, such as, for example, any suitable natural or synthetic, compressible, resilient resin or polymer, the preferred material being a foamed polyester. Similarly, the cover or casing 33 may be made of any suitable material, but preferably is made of a flexible, water-repellent, wear-resistant material, such as, for example, canvas duck or rubber-impregnated nylon fabric.

In each of the pad units 30, the core 32 preferably is substantially square in transverse cross section, and has one face 34 thereof, FIG. 8, secured by a suitable adhesive, not shown, to one face 35 of the respective backing member 31, in substantially flat juxtaposition thereto.

Each of the covers 33 includes a front wall 36 and two side walls 37 and 38, with the side walls 37 and 38 extending rearwardly from opposite side edges of the front wall 36 in substantially parallel relation to each other. The covers 33 are disposed around the respective cores 32 in snug fitting relation thereto, and the longitudinal edge portions of the side walls 37 and 38 thereof, remote from the respective front walls 36, are secured to the longitudinal side edges of the respective backing members 31 by a suitable means such as nails or screws 39, FIGS. 4, 5 and 8. Each of the covers 33, also includes end walls 40 and 41, FIGS. 1 and 2, closing the top and the bottom thereof, respectively.

The head pad 5, like the side pads 6 and 7, also includes a pad unit 42. The pad unit 42 is of the same construction as the pad units 30, embodying a core 32 mounted on one face of an elongated backing member 31, and enclosed thereon by a cover member 33, FIG. 7, the cover 33 of the pad unit 42 embodying end walls 40 and 41 closing the ends of the latter.

Each of the side members 15 and 16 of the mounting brackets 11–13 on the supporting members 9 embodies inner or rear, upwardly opening slots 43 in the upper longitudinal edge portion thereof, FIGS. 3–5, for a purpose which will be discussed in greater detail presently. The slots 43 in the side members 15 are disposed in vertical alignment with each other, as are the slots 43 in the side members 16, with the slots 43 in the side members 15 and 16 of each of the individual brackets 11–13 being disposed in horizontal alignment with each other.

In addition, the side members 15 and 16 of each of the mounting brackets 11–13 embody outer or front, upwardly opening, horizontally aligned slots 44, 45 and 46, respectively, in the upper longitudinal edge portions thereof, FIGS. 3–5, the slots 44–46 being spaced outwardly away from the respective backing members 10 a greater distance than the slots 43. In the preferred form of the loading dock shelter 1, the slots 44–46 are spaced an equal distance from the slots 43 in the respective mounting brackets 11–13, with the slots 44 being of the same size and configuration as the slots 43; the slots 45 having substantially twice the lateral width of slots 44, FIGS. 4 and 5; and the slots 46 being substantially L-shaped, as viewed in FIG. 3, and having substantially the same lateral width as the slots 45, FIGS. 4 and 5. As may be seen in FIG. 5, each of the slots 46 embodies a front edge portion 47 which opens outwardly through the upper edge portion of the respective side member 15 or 16 of the mounting bracket 13, and a lower portion 48, which projects rearwardly from the lower end of the front edge portion 47 in downwardly spaced relation to the upper edge of the respective side member 15 and 16.

Each of the pad units 30 of the side pads 6 and 7 embodies three hanger members 49 mounted on the face of the backing member 31 remote from the core 32, in spaced relation to each other, FIGS. 4 and 5. The hanger members 49 are identical in construction, each embodying an elongated rod 50 secured to a bracket 51 by suitable means, such as, welding, with the bracket 51 secured to the respective member 31 by suitable means such as bolts 52, as shown in FIG. 6. The rods 50 are disposed substantially perpendicular to the length of the respective backing members 31, and project laterally outwardly from both sides thereof. The hanger members 49 are so spaced from each other longitudinally of each of the backing members 31 as to space the rods 50 from each other distances corresponding to the spacing of the upper edges of the side members 15 and 16 of the mounting brackets 11–13.

With this construction, it will be seen that the pad units 30 of the side pads 6 and 7 may be disposed in one operative position on their respective supporting members 9 in which the rods 50 of respective hangers 49 rest in the inner or rear slots 43 in the mounting brackets 11–13, respectively, to thereby releasibly support the pad units 30 in relatively closely adjacent relation to the side wall 2 of the warehouse 3. The slots 43 are so disposed in the mounting brackets 11–13, that when the rods 50 are thus positioned in the slots 43, the front of the pad units 30, as defined by the front walls 36 of the cover members 33 thereof, are disposed in inwardly or rearwardly spaced relation to the front edge portion of the bumper 8, as shown in FIG. 2.

When it is desired to move the pad units 30 of the side pads 6 and 7 into position wherein they project forwardly or outwardly of the bumper 8, they may be lifted upwardly to thereby disengage the rods 50 from the respective slots 43, and moved outwardly into position to dispose the upper rod 50 over the slot 44, the intermediate or central rod 50 over the slot 45, and the lower rod 50 over the front edge portion 47 of the slot 46. The pad units 30 may then be lowered so as to dispose the upper, intermediate and lower rods 50 in the slots 44–46, respectively, and the lower end portions of the pad units 30 may then be swung rearwardly or inwardly toward the warehouse 2, around the upper rods 50, to thus dispose the intermediate rods 50 in the rear edge portions of the slots 45, and dispose the lowermost rods 50 in the rear end portions 48 of the slots 46. In this position of the pad units 30, the rear end portions 48 of the slots 46 act as a latch for preventing the pad units 30 from being moved upwardly out of the slots 44–46 by straight vertical movement thereof, the portions of the side members 15 and 16 of the mounting bracket 13, which define the upper portions of the rear end portions 48 of the slots 46, overlying the lower-most rods 50 so as to prevent such vertical upward movement of the pad units 30. Thus, it will be seen that, if, when the pad units 30 are disposed in the aforementioned outer or front position, they are engaged by a truck, or the like, upward and downward movement of the rear end portion of the truck, such as often occurs during loading and unloading of a truck, will be ineffective to disengage the pad units 30 from their supported position on the mounting brackets 11–13.

In the aforementioned outer or front position of the pad units 30, the front faces thereof, as defined by the front walls 36 of the respective cover members 33 thereof, project outwardly or forwardly beyond the front face of the bumper 8, as illustrated in FIG. 1. In such position, it will be seen that the side pads 6 and 7 are disposed in operative position for sealingly engaging the rear edge portion of a truck backed into loading position relative to the doorway 4 of the warehouse 3, against the bumper 8.

The pad unit 42 of the head pad 5 is mounted on the mounting brackets 21–23 of the supporting member 19 by three hinges 53, FIG. 2. Each of the hinges 53 is secured to the outer face of the upper side member 25 of a respective one of the brackets 21–23 at the edge thereof remote from the base 24, FIG. 7. The hinges 53 are attached by suitable means such as screws or nails 54 to the face of the backing member 31 of the head pad 42 remote from the core 32 thereof in such position that the pad unit 42 may be swung therearound between a downwardly disposed position, as shown in broken lines in FIG. 7, and an upwardly disposed position, as shown in solid lines in FIG. 7.

When the pad unit 42 is disposed in the aforementioned downwardly disposed position, it is centered between the side members 25 and 26 of the mounting brackets 21–23 in abutting engagement with the faces of the abutment members 27 and 28 thereon remote from the bases 24. In such position, the pad unit 42 projects outwardly from the supporting member 19 and the warehouse wall 2 such a distance that the front or outer face thereof, as defined by the front wall 36 of the cover member 33 thereof, is disposed in uniplanar relation to the front faces of the pad units 30 of the side pads 6 and 7, when the latter are disposed in their outer or front position, as shown in FIG. 1. In such position of the pad unit 42, it projects outwardly or forwardly beyond the front face of the bumper 8, and is disposed in position wherein the front face of the pad unit 42 may be sealingly engaged by the top of the rear end of a truck disposed in normal operative position relative to the doorway 4, for loading and unloading the truck therethrough, the pad unit 42 being held outwardly by its engagement with the abutment members 27 and 28 against the compressive force exerted by the truck engaged therewith.

When it is desired to move the head pad unit 42 out of position for such engagement with a truck, it is merely necessary to swing it upwardly around the hinges 53 into position wherein it rests on top of the outer face of the side members 25 of the brackets 21–23, as illustrated in solid lines in FIG. 7. In such position, the pad unit 42 is disposed inwardly or rearwardly of the front face of the bumper 8 in such position that it, normally, will be disposed in spaced relation to the rear end of a truck, which is disposed in position relative to the doorway 4 for loading and unloading of the truck therethrough. If desired, suitable fastening means, such as, for example, a hook or suitable tying member, or the like, not shown, may be secured to the warehouse wall 2 for releasibly holding the pad unit 42 in the retracted, raised position on top of the brackets 21–23, shown in solid lines in FIG. 7.

It will be observed that the loading dock shelter 1 is of a type which may be termed a "pad-type". That is, it embodies fabric or sheet material affording the casing of a pad or pillow, or the like, as distinguished from fabric or sheet material affording walls and curtains supported in more or less a tentlike manner.

Warehouse doorways of the type involved herein, are commonly of substantial size, such as, for example, being 10 or 12 feet high and 8 or 9 feet wide, and in the preferred form of the present invention, the loading dock shelter 1 is of such size that it will completely surround the top and sides of such a doorway. Bumpers used with warehouse doorways, such as, for example, the bumpers 8 shown in FIGS. 1 and 2, commonly project outwardly away from the warehouse wall a substantial distance, such as, for example, 17 inches, or the like. In the preferred form of the present invention, when the loading dock shelter 1 is disposed in extended position, it projects outwardly from the warehouse wall a sufficient distance so as to afford compression of 2 to 3 inches of the core 32 of the pads 5–7 by the rear end of a truck backed into engagement with the bumper 8 in operative position for loading and unloading the truck through the doorway 4, the cores 32 having a normal, uncompressed width and thickness in the nature of 10 to 12 inches; and when the loading dock shelter 1 is disposed in retracted position, the pads 5–7 are spaced from the rear end of such a truck, disposed in the aforementioned loading and unloading position, a distance of not less than 2 inches. Such spacing of the pads 5–7 from such a truck, when the pads are in retracted position, affords ventilation between the truck and the warehouse wall 2.

Each of the side pads 6 and 7 embodies two side curtains 57 and 58 mounted on opposite sides of the respective supporting members 9 in position to be normally disposed in overlying relation to the outer faces of the side members 15 and 16, respectively, of the mounting brackets 11–13 thereof, FIG. 8. The side curtains 57 and 58 are of such length that they extend the full length of the side pads 6 and 7, and are secured at one longitudinal edge portion to the adjacent longitudinal edges of the respective backing members 10 by suitable means such as nails or screws 59. Molding clips 60, made of suitable material, such as, for example, steel or aluminum, are mounted on beads 61 formed on the other longitudinal edge portions of the side curtains 57 and 58, and are latchingly engaged around the front, free edge portions of the respective side members 15 and 16, FIG. 8. Normally, the side curtains 57 and 58 are disposed in overlying relation to the side members 15 and 16 and the molding clips 60 are latchingly engaged therewith, as shown in FIG. 8. However, if desired, during movement of the pad members 30 between retracted position, as shown in FIG. 5 and extended position, as shown in FIG. 4, the molding clips 60 may be manually disengaged from the side members 15 and 16 and the side curtains 57 and 58 may be peeled away from the side members 15 and 16 to expose the slots 43–46 on the supporting members 9 to view. After movement of the pad members 30 between the aforementioned retracted and extended positions thereof has been completed, the side curtains 57 and 58 may again be disposed in closely overlying relation to the outer faces of the side members 15 and 16, and the molding clips 60 may again be latchingly engaged with the front free edge portions of the side members 15 and 16 to hold them in such position.

From the foregoing it will be seen that the present invention affords a novel loading dock shelter of the pad type, which embodies a head pad and two side pads, each constituted and arranged in a novel and expeditious manner.

In addition, it will be seen that the present invention affords a novel loading dock shelter of the pad type, wherein the side pads thereof are supported, and may be manually adjusted between retracted and extended positions in a novel and expeditious manner, and, if desired, may be quickly and easily removed from a warehouse wall.

Also, it will be seen that the present invention affords a novel loading dock shelter of the pad type, wherein the head pad is supported, and may be readily moved between an extended and retracted position in a novel and expeditious manner.

Also, it will be seen that the present invention affords a novel loading dock shelter of the pad type which is practical and efficient in operation, and which may be readily and economically produced commercially.

Thus, while we have illustrated and described the preferred embodiment of our invention, it is to be understood that this is capable of variation and modification, and we therefore do not wish to be limited to the precise details set forth, but desire to avail ourselves of such changes and alterations as fall within the purview of the following claims:

We claim:
1. In combination with a wall having a doorway therein, a loading dock shelter comprising
 a. elongated pad means, comprising
  1. a backing member, and
  2. resilient, yieldable means mounted on said backing member and projecting outwardly therefrom, and
 b. other means supporting said pad means in position to extend along the top and sides of said doorway in said wall,
 c. said other means being mounted on said wall in outwardly projecting relation thereto,
 d. at least certain of said pad means being bodily adjustable, as a unit, inwardly and outwardly along said other means between two operative positions on said other means,
 e. said adjustable pad means projecting outwardly a greater distance from said wall when disposed in one of said operative positions than when said adjustable pad means is disposed in the other said operative position,
 f. said first mentioned pad means comprising
  1. a head pad extending along the top of said doorway, and
  2. two side pads extending along the sides of said doorway,
 g. said head pad and said side pads being separable from each other,
 h. said brackets having horizontally spaced elongated side members.
 i. said side members having inner and outer upwardly opening notches spaced from each other longitudinally thereof,
 j. said side pads having supporting members thereon, and
 k. said supporting members being disposed
  1. in said outer notches when said side pads are disposed in said one operative position, and
  2. in said inner notches when said side pads are disposed in said other operative position.
2. The combination as defined in claim 1 and in which a. said head pad is hingedly connected to said bracket members for pivotal movement thereon around a substantially horizontally extending axis between
1. said one position wherein said head pad projects outwardly from the side of said bracket members remote from said warehouse wall, and
2. said other position wherein said head pad is disposed on top of said bracket members.

3. In combination with a wall having a doorway therein, a loading dock shelter comprising
a. elongated pad means, and
b. other means supporting said pad means in position to extend along the top and sides of said doorway in said wall,
c. said pad means being adjustable between two operative positions on said other means,
d. said pad means projecting outwardly a greater distance from said wall when disposed in one of said operative positions than when said pad means is disposed in the other of said operative positions,
e. said pad means comprising
1. a head pad extending along the top of said doorway, and
2. two side pads extending along the sides of said doorway, and
f. said head pad and said side pad being separable from each other
g. said other means including substantially U-shaped brackets mounted on said wall in outwardly opening position relative thereto on each side of said doorway,
h. said other means including bracket members having portions projecting outwardly from said wall,
i. said side pads being movable along said portions between said operative positions,
j. said portions having inwardly and outwardly disposed retaining means,
k. said side pads having supporting means selectively engageable with said retaining means, and
l. said side pads being disposed in said other and one operative positions when said supporting means are engaged with said outwardly and inwardly disposed retaining means, respectively.

4. A loading dock shelter as defined in claim 3, and which includes
a. elongated side curtains
1. mounted on the oppositely disposed outer faces of said side members of said brackets, and
2. extending along respective ones of said side pads.

5. A loading dock shelter as defined in claim 4, and which includes
a. molding strips
1. extending along and secured to longitudinal edges of said side curtains, and
2. disposed on the side of said side members remote from the respective side curtains to which they are secured for releasably securing said side curtains to the outer edge portions of said brackets.

6. In combination with a wall having a doorway therein, a loading dock shelter comprising
a. elongated pad means, and
b. other means for a supporting said pad means in position to extend along the top and sides of said doorway in said wall,
c. said pad means being adjustable between two operative positions on said other means,
d. said pad means projecting outwardly a greater distance from said wall when disposed in one of said operative positions than when said pad means is disposed in the other of said operative positions,
e. said pad means comprising
1. a head pad extending along the top of said doorway, and
2. two side pads extending along the sides of said doorway, and
f. said head pad and said side pads being separable from each other,
g. said other means including substantially U-shaped brackets mounted on said wall in outwardly opening position relative thereto on each side of said doorway,
h. said brackets having horizontally spaced elongated side members,
i. said side members having inner and outer upwardly opening notches spaced from each other longitudinally thereof.
j. said side pads comprising
1. elongated backing members,
2. pad units mounted on one face of respective ones of said backing members and extending longitudinally thereof,
3. other brackets mounted on the faces of said backing members remote from said pad units, and
4. elongated supporting members on said other brackets, and
k. said supporting members being disposed
1. in said outer notches when said side pads are disposed in said one operative position, and
2. in said inner notches when said side pads are disposed in said other operative position.

7. In a warehouse embodying a wall having a doorway therein, and a bumper projecting outwardly away from said wall adjacent to said doorway, the combination comprising
a. a loading dock shelter mounted around said doorway,
b. said shelter comprising
1. supporting means mounted on said wall adjacent to the top and sides of said doorway,
2. an elongated head pad
a. mounted on said supporting means, and
b. extending along the top of said doorway, and
3. two side pads
a. mounted on said supporting means, and
b. extending along respective sides of said doorway,
c. said head pad and said side pads being adjustable on said supporting means between two operative positions,
d. said head pad and said side pads
1. projecting outwardly away from said wall a greater distance than said bumper when disposed in one of said positions, and
2. projecting outwardly away from said wall a lesser distance than said bumper when disposed in the other of said positions,
e. said supporting means comprising brackets spaced along the top and respective sides of said doorway,
f. said brackets spaced along said sides of said doorway having two spaced notches in the upper edge portions thereof,
g. said side pads including supporting members thereon, and h. said supporting members being disposed
1. in one of said notches when said side pads are disposed in said one position, and
2. in the other of said notches when said side pads are disposed in said other position.

8. In a warehouse embodying a wall having a doorway therein, and a bumper projecting outwardly away from said wall adjacent to said doorway, the combination comprising
 a. a loading dock shelter mounted around said doorway,
 b. said shelter comprising
  1. supporting means mounted on said wall adjacent to the top and sides of said doorway,
  2. an elongated head pad
   a. mounted on said supporting means, and
   b. extending along the top of said doorway, and
  3. two side pads
   a. mounted on said supporting means, and
   b. extending along respective sides of said doorway,
 c. said head pad and said side pads being adjustable on said supporting means between two operative positions,
 d. said head pad and said side pads
  1. projecting outwardly away from said wall a greater distance than said bumper when disposed in one of said positions, and
  2. projecting outwardly away from said wall a lesser distance than said bumper when disposed in the other of said positions,
 e. said head pad being disposed between said side pads when said head pad is disposed in said one position, and
 f. said head pad being disposed above said side pads when said head pad is disposed in said other position.

9. In a loading dock shelter for mounting on a warehouse wall adjacent to a doorway therein, the combination comprising
 a. an elongated side pad, and
 b. means adapted to be mounted on such a warehouse wall for supporting said side pad along one side of said doorway,
 c. said means comprising vertically spaced brackets,
 d. each of said brackets having inner and outer, upwardly opening notches in the upper edge portions thereof,
 e. said side pad having supporting members therein for engagement in said notches, and
 f. said side pad being supported by said brackets in
  1. one position when said supporting members are disposed in said inner notches, and
  2. another position when said supporting members are disposed in said outer notches.

10. The combination as defined in claim 9, and in which
 a. one of said notches in one of said brackets embodies
  1. an upwardly opening outer side portion remote from said inner notch on said one bracket, and
  2. a lower end portion
   a. projecting toward said inner notch on said one bracket from said outer side portion, and
   b. disposed below an overlying portion of said one bracket, and
 b. one of said supporting members is disposed in said lower end portion in underlying relation to said overlying portion when said side pad is disposesd in said other position.

11. In combination with a wall having a doorway therein, a loading dock shelter comprising
 a. elongated pad means, comprising
  1. a backing member, and
  2. resilient, yieldable means mounted on said backing member and projecting outwardly therefrom, and
 b. other means supporting said pad means in position to extend along the top and sides of said doorway in said wall,
 c. said other means being mounted on said wall in outwardly projecting relation thereto,
 d. at least certain of said pad means being bodily adjustable, as a unit, inwardly and outwardly along said other means between two operative positions on said other means,
 e. said adjustable pad means projecting outwardly a greater distance from said wall when disposed in one of said operative positions than when said adjustable pad means is disposed in the other of said operative positions,
 f. said first mentioned pad means comprising
  1. a head pad extending along the top of said doorway, and
  2. two side pads extending along the sides of said doorway,
 g. said head pad and said side pads being separable from each other,
 h. said other means including bracket members having portions projecting outwardly from said wall,
 i. said side pads being movable along said portions between said operative positions,
 j. said portions having inwardly annd outwardly disposed upwardly opening notches therein,
 k. said side pads having supporting members selectively engageable in said notches, and
 l. said side pads being disposed in said other and one operative positions when said supporting members are engaged in said outwardly and inwardly disposed notches, respectively.

12. In combination with a wall having a doorway therein, a loading dock shelter comprising
 a. elongated pad means, and
 b. other means supporting said pad means in position to extend along the top and sides of said doorway in said wall,
 c. said pad means being adjustable between two operative positions on said other means,
 d. said pad means projecting outwardly a greater distance from said wall when disposed in one of said operative positions than when said pad means are disposed in the other of said operative positions,
 e. said pad means comprising
  1. a head pad extending along the top of said doorway, and
  2. two side pads extending along the sides of said doorway, and
 f. said head pad and said side pads being separable from each other,
 g. said other means including bracket members having portions projecting outwardly from said wall,
 h. said side pads being movable along said portions between said operative positions,
 i. said portions having inwardly and outwardly disposed upwardly opening notches therein, j. said side pads having supporting members selectively engageable in said notches,
k. said side pads being disposed in said other and one operative positions when said supporting members are engaged in said outwardly and inwardly disposed notches, respectively, and
l. said head pad being hingedly connected to said bracket members for pivotal movement thereon around a substantially horizontally extending axis between
   1. said one position wherein said head pad projects outwardly from the side of said bracket members remote from said wall, and
   2. said other position wherein said head pad is disposed on top of said bracket members.

* * * * *

UNITED STATES PATENT AND TRADEMARK OFFICE
CERTIFICATE OF CORRECTION

PATENT NO. : 3,934,380
DATED : January 27, 1976
INVENTOR(S) : Cyril P. Frommelt and Sylvan J. Frommelt It is certified that error appears in the above–identified patent and that said Letters Patent are hereby corrected as shown below:

Col. 1, line 40, "treated" should be --heated--;
Col. 2, line 68, "now" should be --not--;
Col. 3, line 18, "EAch" should be --Each--;
Col. 8, lines 55-66, should be --h. said other means including bracket members having portions projecting outwardly from said wall,
  i. said side pads being movable along said portions between said operative positions,
  j. said portions having inwardly and outwardly disposed retaining means,
  k. said side pads having supporting means selectively engageable with said retaining means, and
  l. said side pads being disposed in said other and one operative positions when said supporting means are engaged with said outwardly and inwardly disposed retaining means, respectively.; and Col. 9, lines 32-43, should be --h. said brackets having horizontally spaced elongated side members.
  i. said side members having inner and outer upwardly opening notches spaced from each other longitudinally thereof,
  j. said side pads having supporting members thereon, and

UNITED STATES PATENT AND TRADEMARK OFFICE
CERTIFICATE OF CORRECTION

PATENT NO. : 3,934,380
DATED : January 27, 1976
INVENTOR(S) : Cyril P. Frommelt and Sylvan J. Frommelt It is certified that error appears in the above-identified patent and that said Letters Patent are hereby corrected as shown below:

k. said supporting members being disposed
        1. in said outer notches when said side pads are disposed in said one operative position, and
        2. in said inner notches when said side pads are disposed in said other operative position.

Col. 12, line 35 "annd" should be --and--.

*Signed and Sealed this*

*twentieth* Day of *April 1976*

[SEAL]

Attest:

RUTH C. MASON
*Attesting Officer*

C. MARSHALL DANN
*Commissioner of Patents and Trademarks*